July 15, 1952    J. M. RICHARDS    2,603,124
STEREOSCOPIC TARGET FOR TESTING EYES
Filed Aug. 14, 1947    4 Sheets-Sheet 1
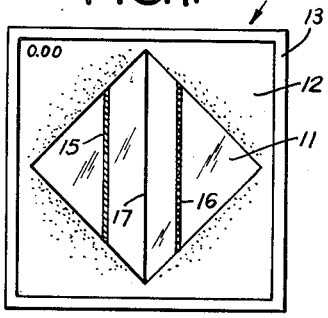
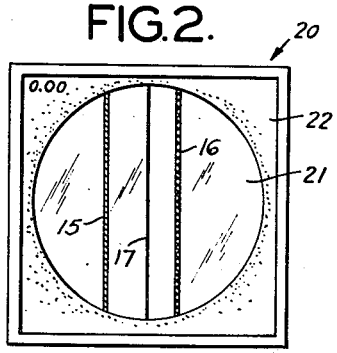
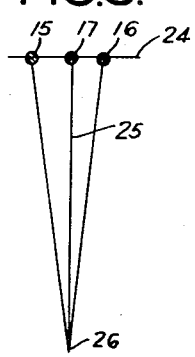
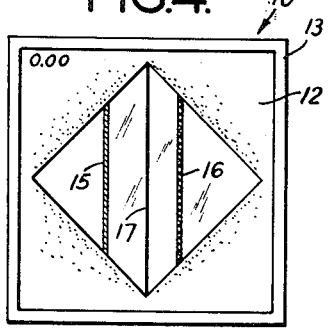
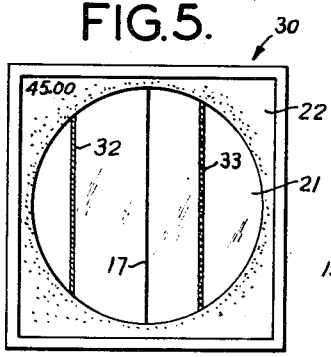
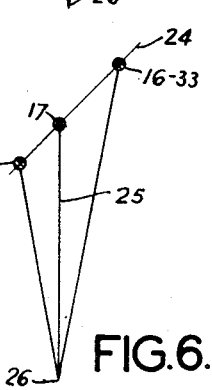
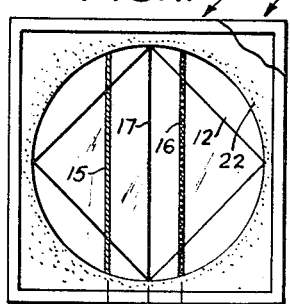
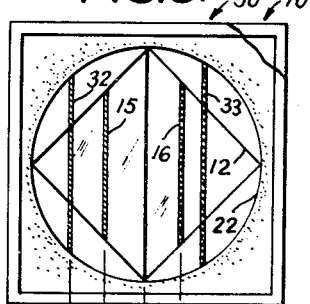
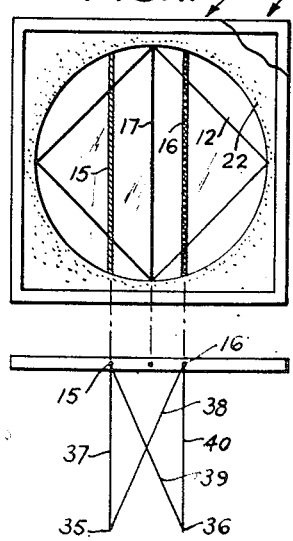
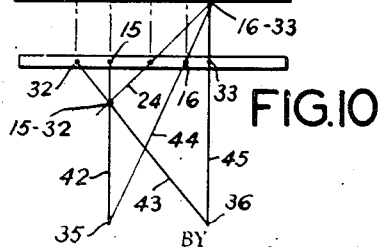
INVENTOR.
John Mark Richards
BY
Emery, Varney, Whittemore & Dix
ATTORNEYS July 15, 1952 J. M. RICHARDS 2,603,124
STEREOSCOPIC TARGET FOR TESTING EYES
Filed Aug. 14, 1947 4 Sheets-Sheet 2

INVENTOR.
John Mark Richards
BY Emery, Varney, Whittemore & Dix
ATTORNEYS.

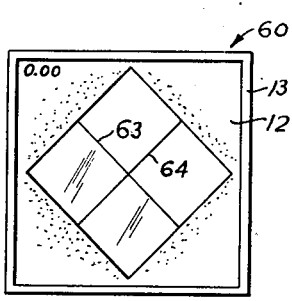
FIG.19.
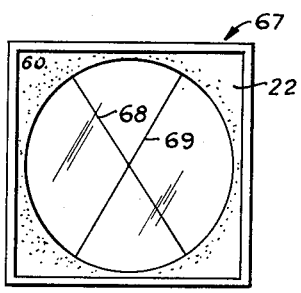
FIG.20.
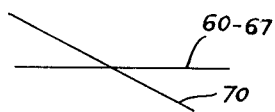
FIG.21.
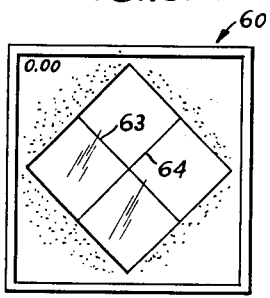
FIG.22.
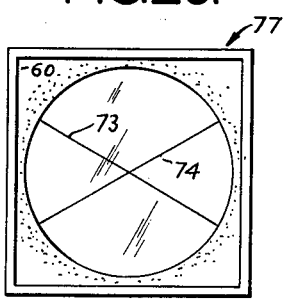
FIG.23.
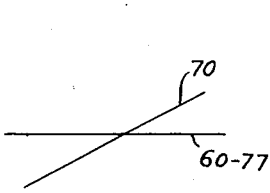
FIG.24.
FIG.25.
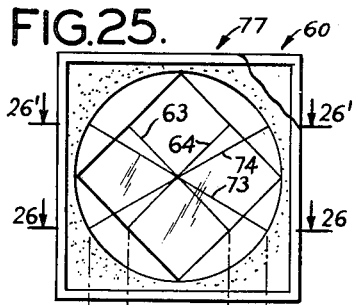
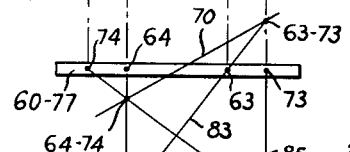
FIG.26.
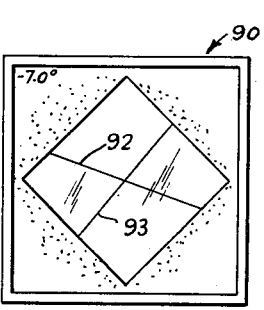
FIG.27.
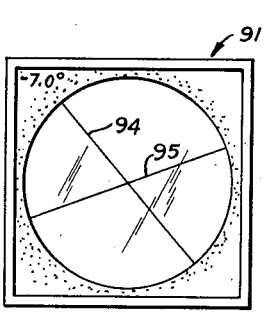
FIG.28.
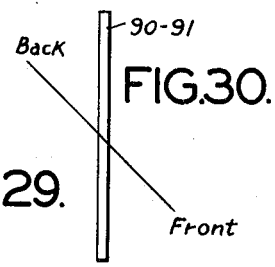
FIG.30.
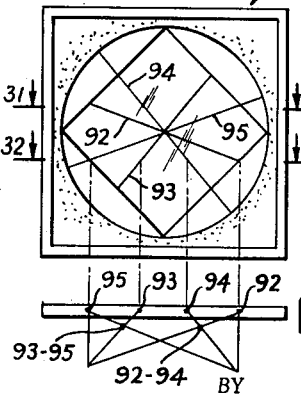
FIG.29.
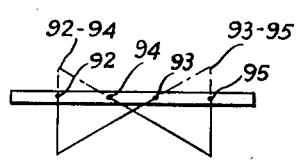
FIG.31.
FIG.32.
INVENTOR.
John Mark Richards
BY
Emery, Varney, Whittemore + Dix
ATTORNEYS.

Patented July 15, 1952

2,603,124

UNITED STATES PATENT OFFICE 2,603,124

STEREOSCOPIC TARGET FOR TESTING EYES

John Mark Richards, Stony Point, N. Y.

Application August 14, 1947, Serial No. 768,672

4 Claims. (Cl. 88—29)

This invention relates to the testing of eyes with depth perception or stereoscopic targets.

One object is to provide improved sets of targets for testing the eyes for asymmetrical tonic extraocular muscle imbalance, which is designated as "anisophoria." Another object is to provide separate sets of depth perception targets for determining the asymmetrical tonic muscle imbalance in the horizontal meridian. The asymmetrical tonic muscle imbalance in the vertical meridian is determined by subtracting that indicated by one set of targets from the combined vertical and the horizontal defects measured by the other set of targets.

It is another object of the invention to provide an improved method of testing eyes by means of depth perception targets. The method obtains data for use with formulae or graphs that indicate the prescription for correcting the defects caused by the asymmetrical tonic muscle imbalance.

Other objects, features and advantages of the invention will appear or be pointed out as the description proceeds.

Figure 11:
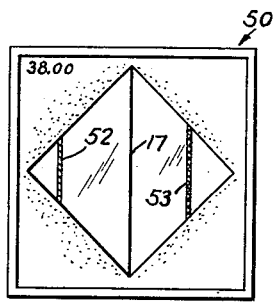
Figure 12:
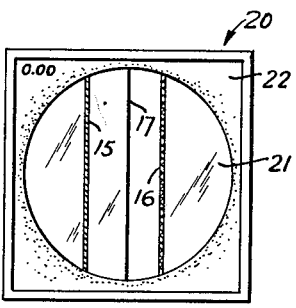
Figure 13:
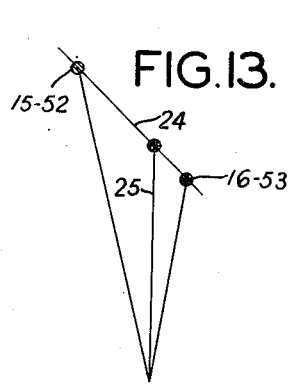
Figure 14:
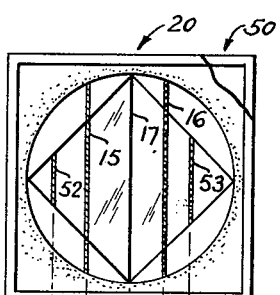
Figure 15:
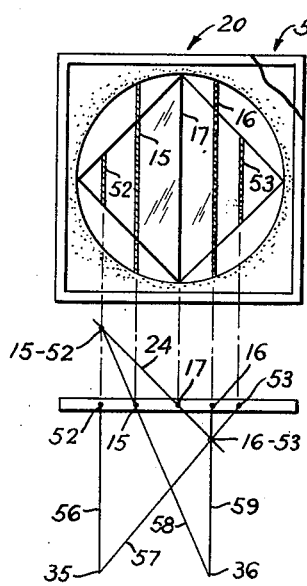
Figure 16:
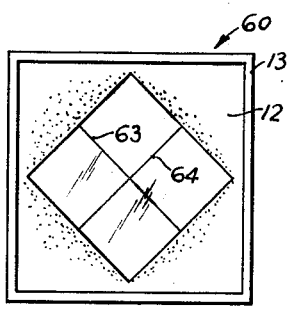
Figure 17:
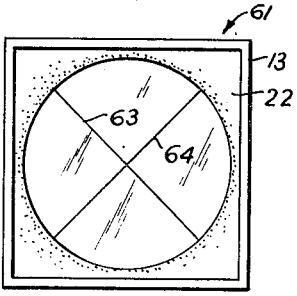
Figure 18:
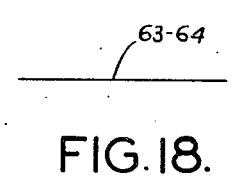
Figure 33:
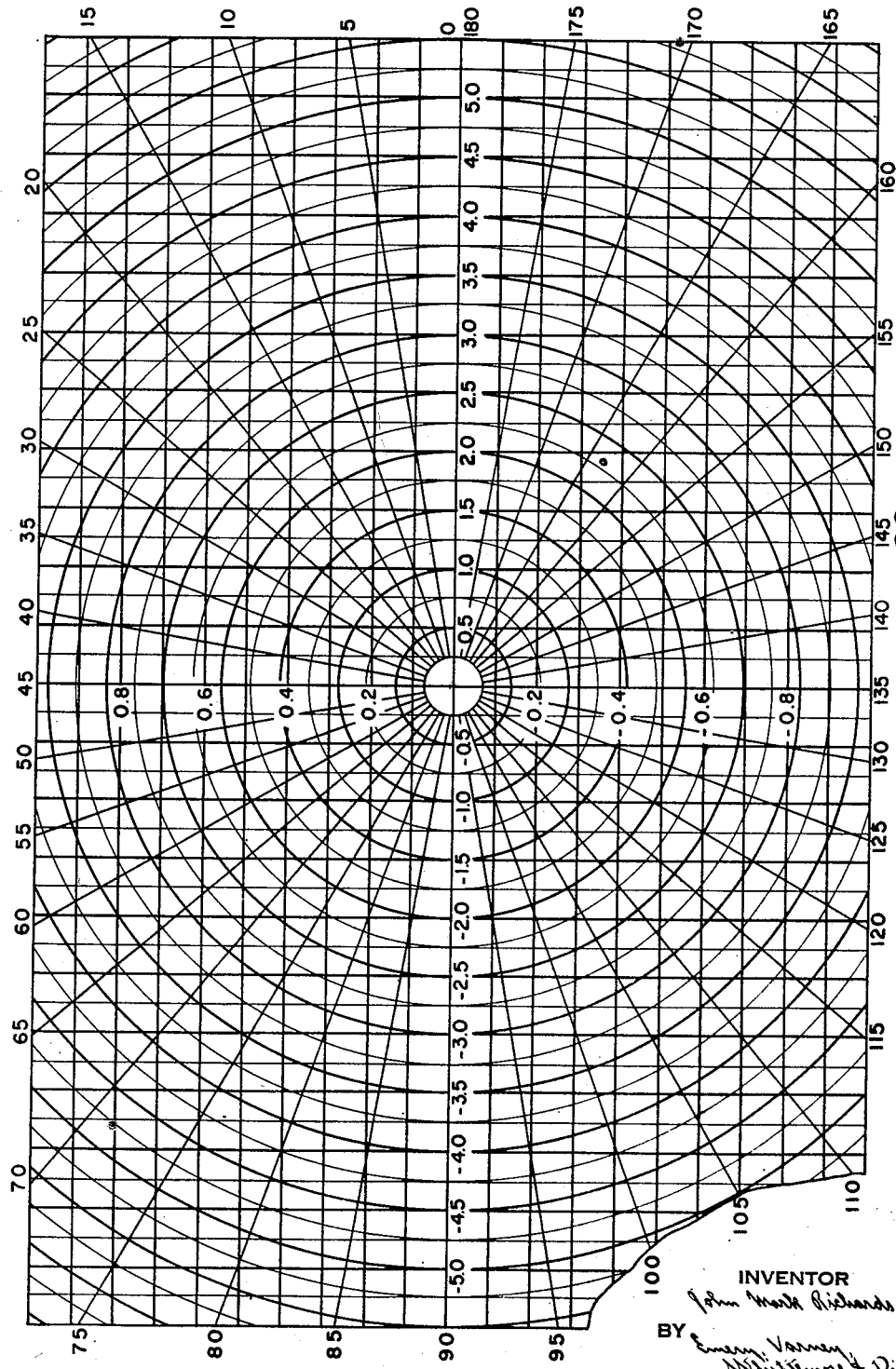

In the drawing, forming a part hereof, in which like reference characters indicate corresponding parts in all the views, Figures 1 and 2 are front views of targets that are used together as the zero targets of a set for stereoscopic viewing to determine tonic muscle imbalance in the horizontal meridian, Figure 3 is a diagrammatic top plan view illustrating the apparent relation of the lines of the targets in Figures 1 and 2 when viewed stereoscopically by a patient having no tonic muscle imbalance, Figures 4 and 5 show one of the zero targets with a second target having lines thereon, the locations of which are correlated with those on the zero target so as to make the right hand line appear to be further from the patient than the left hand line, Figure 6 is a diagrammatic top view showing the apparent relation of the lines of the targets of Figures 4 and 5 when viewed stereoscopically, Figure 7 is a front view showing the zero targets of Figures 1 and 2 superimposed upon one another, Figure 8 is a front view showing the targets of Figures 4 and 5 superimposed upon one another, Figures 9 and 10 are diagrammatic top plan views showing graphic solutions for determining the relative apparent positions of the lines of the targets of Figures 7 and 8 when those targets are viewed stereoscopically, Figures 11 and 12 are front views showing one of the zero targets and another target with which it is used to produce an apparent rotation of the plane of the target lines opposite to rotation obtained with the targets of Figures 4 and 5, Figure 13 is a diagrammatic top view showing the apparent locations of the lines of the targets of Figures 11 and 12 when viewed stereoscopically, Figure 14 shows the targets of Figures 12 and 13 superimposed upon one another, Figure 15 is a diagrammatic top view showing the graphic solution for determining the apparent locations of the lines of the targets of Fig. 14 when those targets are viewed stereoscopically, Figures 16 and 17 are front views of the zero targets of a different set for testing the eyes for the combined tonic muscle imbalance in both the vertical and horizontal meridians, Figure 18 is diagrammatic top view showing the apparent plane of the diagonal markings of the targets of Figures 16 and 17 when viewed stereoscopically by an observer having no tonic muscle imbalance in either the horizontal or vertical meridian, Figures 19 and 20 show the zero target of Fig. 16 and another target having the diagonal lines so correlated with those of the zero target that the plane of the diagonal markings will appear to be turned nearer to the observer's right side than left when the targets are viewed stereoscopically, Figure 21 is a diagrammatic top view showing the apparent plane of the diagonal markings of Figs. 19 and 20 when the targets of those figures are viewed stereoscopically, Figures 22 and 23 show the zero target of Fig. 16 with another target having its diagonal markings so correlated with those of the zero target that the apparent plane of the markings is turned nearer to the observer's left side than to his right when these targets are viewed stereoscopically, Figure 24 is a diagrammatic top view showing the apparent plane of the markings of the targets of Figures 22 and 23 when those targets are viewed stereoscopically, Figure 25 shows the targets of Figures 22 and 23 superimposed upon one another, Figure 26 is a sectional view on the line 26—26 of Figure 25 and a graphic solution showing the way in which the correlation of the lines on the superimposed targets produce an apparent turning of the plane of the diagonal markings, Figures 27 and 28 are front views of other targets for testing variable torsional tonic imbalance, Figure 29 is a front view showing the targets of Figures 27 and 28 superimposed upon one another, Figure 30 is a diagrammatic side view illustrating the apparent tilt of the plane of the diagonal markings of the targets of Figure 29 when those targets are viewed stereoscopically, Figures 31 and 32 are diagrammatic sectional views on the lines 31—31 and 32—32 respectively, showing graphic solutions for the depth perception effects obtained by the correlation of lines shown in Figure 29, Figure 33 is a chart used for deriving a prescription from the clinical data obtained with the targets of Figs. 1–32.

The target shown in Figure 1 comprises a lantern slide 10 having a transparent or translucent area 11 bounded by the rectangular edges of a mask 12. There is conventional binding 13 around the peripheral edges of the slide or target 10. Vertical lines 15 and 16 extend across the area 11, and there is preferably a center line 17 extending across the area 11 parallel to the lines 15 and 16.

The lines 15 and 16 are preferably colored for easy identification, and are shown in the drawing as being green and orange, respectively, though other colors can be used. The center line 17 is black. Various thickness of lines can be used and the thicknesses of the colored lines shown in Figure 1 are exaggerated in order to permit shading for color. The preferred thickness of these lines is of the order of a width subtending about ½ minute of arc.

Figure 2 shows another target slide 20 having a transparent or translucent area 21 bounded by the circular edge of a mask 22. There are lines 15, 16 and 17 on the target 20 identical with the corresponding lines on the target 10 except for the greater length of the lines 15 and 16 that is made possible on target 20 by the larger area 21. In describing these lines 15, 16 and 17 in Figure 2 as being identical with those of Figure 1 it is to be understood that the lines are of the same color and thickness and that the spacing of the lines from one another is exactly the same on both of these "zero" targets. The absolute distance between the lines on the targets 10 and 20 can be arbitrarily chosen but should be of such a value that some other targets of the set can have their lines at greater distance and others at less distance.

When the targets of Figures 1 and 2 are used for testing they are placed in an instrument, or other testing equipment, which exposes the target of Figure 1 to the vision of the left eye only and the target of Figure 2 to the right eye only.

The targets are thus viewed stereoscopically, the term "stereoscopically" being used herein to mean a viewing in which the targets are seen at the same time but each target is seen by a different eye and by only one eye.

Figure 3 is a diagrammatic view in which the lines 15, 16 and 17 are shown as defining a common plane 24 which is perpendicular to the binocular axis of a patient located at the point 26 in the diagram. A more complete explanation of the way in which the similar lines of the targets 10 and 20 cause the lines on the targets to appear in the same plane will be given in connection with Figures 7 and 9.

Figures 4 and 5 show the target 10 and another target 30 which is similar to the target 20 except for the spacing of the colored lines. The target 30 has a green line 32 and an orange line 33 which correspond with the colored lines 15 and 16, respectively, of the target 10, but which are more widely spaced so that when the targets 10 and 30 are viewed stereoscopically, the different colored lines on the targets appear to be at different distances from the patient.

When the targets 10 and 30 are used together for stereoscopic observation, the lines 15 and 32 are fused, and the lines 16 and 33 are similarly fused; and the single lines seen by the patient as a result of his fusion of the lines 15 and 32 will be designated as the "fusion line 15—32." Similarly other lines of various targets will be described as fusion lines and designated by both of the reference characters of the fused lines of the separate targets.

Figure 6 shows the fusion lines 15—32 and 16—33 defining the plane 24 which is at a substantial angle to the binocular axis 25. A graphical solution showing the extent to which the plane 24 is turned will be given in connection with the description with Figure 10.

In Figure 7, the slides 10 and 20 are shown superimposed upon one another merely for the purpose of illustrating the relative positions of the lines and for use with the graphic solution shown in Figure 9. In practice, these targets 10 and 20 are not physically superimposed upon one another, but this view does bring out the purpose of the differences in the shapes of the masks 12 and 22. If these masks had the same geometrical shape, or had any portions which were similar or close enough together to cause the eyes to fuse portions of the mask edges, such fusion might effect the results of the tests. It is a feature of the targets shown in Figures 1 and 2, 4 and 5, and other targets of different sets, that the vertical lines extend across the entire field and there are no points or lines which the eyes can fuse in the vertical meridian. This causes the eyes to remain at rest in the vertical meridian and move to fuse only in the horizontal meridian. The importance of this feature will become apparent as the description proceeds. The targets of Figs. 1, 2, 4 and 5, and those of other sets can be made without any masks, and other masking expedients, such as separate masks in the instrument adjacent the targets or eyepieces, can be used, if desired.

Figure 9 shows a graphical solution for finding the apparent distance of the lines 15 and 16 from a patient viewing these lines on the targets 10 and 20 stereoscopically. This solution is effected by considering the separate targets 10 and 20 as superimposed and indicating the location of the lines of both targets, as seen from above, in Figure 9. Because of the fact that lines 15 and 16 are identically located in both targets 10 and 20, there is only one point 15 and one point 16 in the diagram.

The patient's left eye is located at the point 35 and his right eye at the point 36. The line of vision of the left eye to the line 15 on the target 10 is indicated by the line 37 and the line of vision from the same eye to the line 16 on the target 10 is indicated by the line 38. From the right eye at 36, the line of vision to the line 15 of target 20 is indicated by the line 39, and to the line 16 of target 20 by the line 40. The point at which the lines 37 and 39 intersect is the apparent location of the line 15 to the patient, and similarly the point at which the lines 38 and 40 intersect is the apparent location of the line 16. It is apparent, therefore, that the lines 15 and 16 will both appear to be in the projected plane of the targets when the lines are similarly located on both targets. The expression "projected plane of the targets" is used herein to designate that plane perpendicular to the binocular axis and including the point of convergence of the visual axes through the centers of the targets. The pair of targets having the lines similarly located so that they appear to be in the projected plane of the targets, is referred to in the description and claims as the "zero" targets of the set.

In Figure 10 the left eye at 35 views the line 15 along the line 42 and the right eye at 36 views the line 32 along the line 43. The eyes fuse the lines 15 and 32 at the intersection of the lines 42 and 43. The fusion line 15—32 appears, therefore, to be in front of the projected plane of the targets.

To locate the fusion line for the lines 16 and 33, a line 44 is drawn to line 16 from the position of the left eye at 35, and a line 45 is drawn to the line 33 from the position of the right eye at 36. The intersection of these lines of vision, which is behind the projected plane of the targets, is the location of the fusion line 16—33. The plane 24 defined by the lines on the targets has, therefore, been rotated counterclockwise, as viewed from the top, by the substitution of the target 30 for the target 20.

The difference in the spacing of the lines 32 and 33 of target 30 as compared with the spacing of the lines 15 and 16 of target 20 is exaggerated in the drawing for clearer illustration. In actual practice the differences in spacing between different targets is small and the extent to which the plane 24 is turned is larger for greater distances between the projected plane of the targets and the eyes of the patient. This distance is made very short in the graphs of Figs. 9 and 10 in order to keep the graphs within a small space and to minimize the exaggeration of the spacing of the lines on the targets.

It will be evident that the spacing of the lines of target 20 is magnified in target 30; the magnification is proportional to the ratio of the spacing of lines 15 and 16 to the spacing of lines 32 and 33; and the percentage magnification is proportional to the difference in the spacing of the lines on the respective targets divided by the spacing of the lines of the zero target.

Figure 11 shows another target 50 similar to the target 10, but with different spacing of the lines, for rotating the plane of the lines or markings in a clockwise direction. The target 50 has a green line 52 on its left side, and an orange line 53 on its right side. Figure 13 shows the apparent positions of the fusion lines 15—52 and 16—53 when the targets 50 and 20 are viewed stereoscopically by the patient. The lines define a plane 24 at an angle to the binocular axis of vision 25.

Figure 14 shows the targets 20 and 50 superimposed for use with Fig. 15 in determining graphically the apparent positions of the fusion lines. In this latter figure lines 56 and 57 are drawn from the point 35, at which the left eye is located, to the lines 52 and 53, the only lines seen by the left eye. Other lines 58 and 59 are drawn from the point 36, at which the right eye is located, to the lines 15 and 16, the only lines seen by the right eye. From Fig. 15 it is apparent that the plane 24 defined by the fusion lines has been rotated clockwise, as viewed from the top.

Although the targets 10, 20, 30 and 50 are all slides, it will be understood that opaque targets having the same markings can be used. The advantage of slides is that they can be more easily illuminated, but opaque targets made of paper on heavy board backing are less easily damaged than slides.

The invention has been described thus far as applied to separate targets for the different eyes, and the substitution of one target for another. It will be understood, however, that when the invention is to be used with very simple testing apparatus, such as a sterescope, the targets for the right and left eye are mounted on a common back, and when substitutions are made, both targets are changed at the same time. In carrying out the test of procedure, however, the successive targets for one eye may be identical. Polarized targets can be used in the same way as the other targets or with the targets for both eyes located so that they are on the same target area or on partially overlapping areas and with the lines for the respective eyes polarized in different planes, as by covering with a polarizing sheet. Oppositely polarized lenses are used to view the polarized targets. These targets can be mounted in a book or can be a series of superimposed plates suitably masked and illuminated.

In addition to the zero targets 10 and 20, only one target 30 is shown for imparting a counterclockwise rotation to the plane 24 of the markings, and only one target 50 for giving that plane a clockwise rotation. The full set of targets, however, includes a number of other targets for giving counterclockwise rotation to the plane of the markings, and another group for giving clockwise rotation to the targets. The targets of each group include some that have their lines spaced slightly further apart than the zero target lines on each successive target, and preferably others that have the lines on different targets spaced successively closer together than on the arbitrarily chosen zero targets.

For testing eyes with the targets 10, 20, 30 and 50, the zero targets 10 and 20 are first viewed stereoscopically by the patient. An initial gross adjustment of the instrument or target holder is made, if necessary, to enable the patient to fuse the lines 15, 16 and 17. A prism may be placed in the line of vision to obtain this necessary adjustment. If he has no tonic muscle imbalance, the markings on the targets will appear to be in the same plane. If the right eye magnifies, however, the lines on the target 20 appear to be further apart than those on the target 10, and the plane of the markings is given a rotation nearer to the observer's left side, as shown in Fig. 10.

If the patient viewing the zero targets 10 and 20 reports that the green line 15 appears to be nearer to him than does the orange line 16, then the examiner removes the target 20 and replaces it with another that has the markings slightly closer together. By trying successive targets for the right eye, it is possible to select one in which the reduced spacing of the markings is sufficient to compensate the magnification produced by the right eye and the patient will then report that the markings appear to be at the same distance from him. With further substitution of right eye targets having still closer spacing of the markings that more than compensate for the magnification of the right eye, the patient reports that the green line is further away than the orange, that is, there has been a rotation of the plane of the markings nearer to the patient's right side.

In actual practice the difference between successive targets of a set is so small that a patient cannot always perceive any difference when viewing one target or another. In such cases the examiner "brackets" the correct compensation by putting in targets until the patient notices a rotation of the plane in one direction, and then putting in successive targets with spacing changes in the other direction until the patient notices a rotation of the plane the other way. The correct compensation is then assumed to be midway between the two opposite compensations at which the patient became aware of the turning of the plane of the markings.

Each of the targets 10, 20, 30 and 50 has a legend in the upper left-hand corner indicating the percentage magnification or minification, indicated by a plus or minus sign respectively, as compared with the zero targets. The legend on the target that compensates the asymmetrical tonic muscle imbalance indicates directly the muscle imbalance in the horizontal meridian.

For complete data from this first set of targets, tests may be made for nine positions of gaze, (1) eyes front; (2) eyes right; (3) eyes left; (4) eyes up and front; (5) eyes up and right; (6) eyes up and left; (7) eyes down and front; (8) eyes down and right; (9) eyes down and left. Tests are made in these positions with the targets adjusted to simulate distance, and with the targets set to simulate close vision. On the close tests, all of the positions are preferably depressed through an angle of the order of 20 degrees since most close observation is reading and the eyes are cast down. That is, the "eyes front" position for distance is in a horizontal direction, but the "eyes front" position for close-up is downward at an angle of the order of 20 degrees below the horizontal.

In deciding the value to be chosen for use in selecting a prescription, distance tests are used if the glasses are to be for distance, and the close-up results are used if the glasses are to be for reading. Compromises are worked out to obtain the best results over as many of the positions of gaze as possible but not strictly on an average basis because allowance must be made for the fact that eyes are used mainly in the eyes front position.

Tests for asymmetrical tonic muscle imbalance are made after the eyes have been tested for "refractive" (power) errors and while the patient is wearing the lenses necessary to correct these errors. This is important because the lenses that correct the refractive error sometimes cause the asymmetrical tonic muscle imbalance, and unless tests are made with the refractive correction lenses before the eyes, the final prescription will not be based on complete clinical data.

If the patient has any tonic muscle imbalance which causes an effective torsion error, it is usually demonstrated in the targets of Figs. 1-15 by an apparent tilting of the lines toward or from the patient. This error is hereinafter referred to as "torsional tonic muscle imbalance," and it is compensated by torting the targets with respect to one another. For determining torsional errors, however, the targets of Figs. 27 and 28 are more effective.

Figures 16 and 17 show two target slides 60 and 61 which comprise the zero targets of another series. These targets 60 and 61 have masks 12 and 22 respectively, similar to the targets 20 and 30, but in place of the parallel line markings on the targets 20 and 30, this second series of targets has diagonal markings comprising lines 63 and 64 forming a letter X.

Although the lines 63 and 64 are at an angle of the order of 45 degrees to the vertical. The lines on these zero targets can be at other angles, and the term "diagonal" is used herein to designate a sloping line, that is, a line that is not either horizontal or vertical, or substantially so, when the target is in its intended orientation for use. Best results are obtained with diagonals that slope at angles in the region of 45 degrees, however, and preferably not outside of the range between 35 degrees and 55 degrees.

When the targets 60 and 61 are viewed stereoscopically by a patient having no asymmetrical tonic muscle imbalance, the markings will appear to be at the same distance from the patient and to lie in the projected plane of the targets. If the patient has symmetrical tonic muscle imbalance (or prism error) in the vertical meridian, one of the diagonals will appear to be in a plane closer than the other. This is compensated by effectively raising one of the X targets. The compensation necessary is a measure of the patient's vertical symmetrical tonic muscle imbalance.

Two other apparent changes in the markings on the X-targets of Figs. 16 and 17, that may appear when the targets are observed stereoscopically, are a rotation of the plane of the X about a vertical axis, hereinafter referred to as "turning," and a rotation of the plane of the X about a horizontal axis, hereinafter referred to as "tilting." These effects will be more easily understood after considering some other targets of the X-series.

Figs. 19 and 20 show one of the zero targets 60 of the X-series, and another target 67 with diagonal lines 68 and 69 that make larger angles with the horizontal than do the diagonals 63 and 64. When these targets 60 and 67 are viewed stereoscopically, the patient fuses the lines 63 and 68, and also fuses the lines 64 and 69; but the plane defined by the fused lines, appears to be turned in a clockwise direction, as viewed from the top. The apparent position of the plane of the markings with respect to the projected plane of the targets is indicated in Fig. 21 where the projected plane of the targets is indicated by the reference characters 60—67, and the apparent plane of the markings is indicated by the reference character 70.

Figs. 22 and 23 show targets that have diagonal markings correlated so as to cause an apparent turning of the plane of the marking in a counterclockwise direction. This result is obtained by having diagonal markings 73 and 74 on a target 77 at a smaller angle to the horizontal than are the diagonal markings 63 and 64 on the zero target 60. Figure 24 shows the plane 70 in which the diagonal markings of the targets 60 and 77 appear to lie when those targets are viewed stereoscopically and the patient fuses the diagonals 63 and 73, and the other diagonals 64 and 74.

A graphic solution for determining the apparent plane 70 of the diagonal markings on the targets 60 and 77 is shown in Figs. 25 and 26. In Fig. 25 the targets 60 and 77 are superimposed upon one another, and Fig. 26 is a diagrammatic sectional view through the superimposed targets at the level of the line 26—26. This section would be the same if taken at the level of the line 26'—26', except for a reversal of the reference characters that are applied to the diagonals.

In the graphic solution shown in Fig. 26 points on the lines 63, 64, 73 and 74 are used; these points being those at which the line or plane 26—26 intersects the diagonal lines. From the point 35, at which the right eye is located, lines 83 and 84 are drawn to the points 63 and 64, on the diagonals visible to the left eye. Similarly, lines 85 and 86 are drawn from the point 36, at which the right eye is located, to the points 73 and 74 on the diagonals which are visible to the right eye. The lines 84 and 86 intersect ahead of the projected plane of the targets, and the line 83 and 85 intersect behind the projected plane of the targets, showing that the plane 70 in which the diagonals appear to lie has been given a counter-clockwise rotation by substituting the target 77 for the target 67.

When testing the patient's eyes with the X-targets 60, 61, 67 and 77, and other X-targets of the same series which differ from those shown merely by the differences in the angles between the diagonal markings, the patient first observes the zero targets 60 and 61 stereoscopically.

If the patient reports that the plane defined by the diagonals 63 and 64 appears to be closer to him on the left side, then another target, such as the target 67, is substituted for the zero target 61. The substituted target has the effect of making the plane of the diagonal markings appear to be closer to the patient on the right side, and by substituting various targets for the right eye, the examiner can find a target which compensates for the error in the patient's eyes and makes the plane of the diagonal markings coincident with the projected plane of the targets. The extent to which the plane 70 appears to turn depends upon the distance from the patient's eyes to the projected plane of the targets.

If the patient initially reports that the plane of the diagonal markings appears closer to him on the right side, then the targets, such as the target 77, having smaller angles of inclination between the diagonal markings and the horizontal are substituted for the right eye target until a target is found that compensates for the error.

Each of the targets 60, 61, 67 and 77, and the other X-targets of the set, has a legend in the upper left-hand corner of the targets for indicating the percent magnification of the respective targets.

The differences in the angles that the diagonal markings on the targets 61, 67, and 77 make with the horizontal are exaggerated in the drawing for clearer illustration. The percent magnification in the vertical meridian that will be compensated by the target 67 or 77 is proportional to the ratio obtained by taking the tangent of the angle that a diagonal of target 67 or 77 makes with the horizontal, subtracting from this tangent the tangent of the corresponding angle of the diagonal of the zero target 60, and then dividing this difference by the angle between the horizontal and the diagonal of the zero target.

If the examiner has to use a target having a plus 0.125 legend in order to make the apparent plane of the diagonal markings coincide with the projected plane of the targets, this indicates that there is a tonic muscle imbalance producing a magnification equal to 0.125 percent in the eye used to view the plus 0.125 target. This error is a resultant defect, and in order to find the asymmetrical tonic muscle imbalance in the vertical meridian, the results obtained with the line targets of Figures 1 to 15 are subtracted from the results obtained with the X-targets of Figures 15 to 26.

Torsional tonic muscle imbalance causes the diagonal markings on the X-targets to appear to be in a plane that tilts forwardly or rearwardly. If the patient reports that the plane of the diagonals has a tilt, then the examiner rotates one or both of the targets in its own plane or substitutes another target for one or both of the zero targets, and each of these substituted targets for correcting tilt of the plane has the bisector of either angle of the diagonals at a different angle to the horizontal than is the corresponding bisector of the zero target.

Figures 27 and 28 show two targets 90 and 91, respectively, on which the bisectors of the angles between the diagonals extend in different directions on the target for the right eye than on the target for the left eye.

The target 90 has diagonal lines 92 and 93 extending across its field, and the target 91 has diagonal lines 94 and 95. The correlation of these lines is shown clearly in Figure 29 in which the targets 90 and 91 are superimposed upon one another, and the apparent slope of the plane in which the diagonal lines appear to lie, when the targets 90 and 91 are viewed stereoscopically, is indicated in Figure 30 which is a view looking from the side edge of the plane of the targets.

Figures 31 and 32 are diagrams showing graphic solutions obtaining the apparent positions of the diagonals seen by a patient who views the targets 90 and 91 stereoscopically and fuses the diagonal 92 with the diagonal 94 and the diagonal 93 with the diagonal 95. These solutions are obtained by taking a horizontal plane 31—31 at one level through the superimposed targets of Figure 29, and locating the points at which the diagonals intersect this plane. These points are indicated in Figure 31 by the reference characters of the diagonals. A similar plane 32 is then taken at another level through the superimposed targets of Figure 29, and lines are drawn from the positions of the right and left eyes to the points of those diagonals which are visible to the respective eyes.

The points at which the lines of vision intersect; are the points at which the eyes will fuse the respective diagonals at the levels of the planes 31 and 32, the solution being worked out in the same way as with Figure 26. From Figures 31 and 32 it is apparent that the fusion line 92—94 appears to be behind the projected plane of the targets at the level 31—31 and ahead of this projected plane of the targets at the level 32—32. Similarly the fusion line 93—95 appears to be further from the patient at the level 31—31 than at the level 32—32. This indicates that the plane defined by the fusion lines 92—94, 93—95 tilts rearwardly, that is, further from the patient at the top than at the bottom.

In testing the eyes, if the patient, when viewing the zero targets 60 and 61 reports that the plane of the diagonals tilts forwardly (plus) or rearwardly (minus), the examiner rotates one or both of the targets in their own planes to compensate for the torsion error and thus substitutes another target, such as the target 90 or 91, or both. By trying different targets, the examiner finds one that obtains the desired compensation, and these targets for correcting apparent tilt of the plane of the markings have legends thereon indicating the torsion angle for which the respective targets compensate. This torsion angle is part of the clinical data that is used for determining the prescription for correcting the patient's asymmetrical tonic muscle imbalance. As in the case of the other targets, the tests are made in the different positions of gaze and with the patient wearing any lenses that are necessary for correcting power errors of his eyes.

Figure 33 shows a chart for converting the clinical data obtained from the targets to the data necessary for the lens prescription. The clinical data required for use in the chart is the percentage magnification in the horizontal meridian, indicated by the letter $P_h$; and percentage magnification in the vertical meridian indicated by the letter $P_v$; and the angle of torsion, indicated by the letter T. As previously explained, the value of $P_h$ is obtained from the line targets of Figures 1 to 15; the value of $P_v$ is determined by subtracting $P_h$ from the percentage magnification determined by the X-targets of Figures 16 to 26; and the value of T is determined from the torsional X-targets of Figures 27 to 32.

The chart of Figure 33 is used to find the meridianal size difference, indicated by the letter R; the axis of meridian correction is indicated by the letter X; and the overall or spherical size correction, indicated by the letter O.

The chart of Figure 33 is used by moving from the center to the right, "plus," or left, "minus," to the value of $P_v$ minus $P_h$ along the horizontal axis of the chart. From that point the user of the chart goes up "plus" or down "minus" to the horizontal line representing the value of T. The answer for R is then read along the nearest radius, or interpolated between adjacent radii and is in units the same as the abscissa (R is always +); the answer for X is read at the end of this nearest radius or interpolated radius, and O is equal to one-half of $(P_v + P_h - R)$. Transposition to a more convenient form may be made if desired clinically after combining O with R at the cylinder axis.

The preferred embodiments of the invention have been illustrated and described, but changes and modifications can be made, and some features of the invention can be used alone or in different combinations without departing from the invention as defined in the claims.

What is claimed is:

1. A set of depth perception targets for testing the eyes including a target member having an observation field on which there are two substantially parallel and different colored lines serving as target means for observation by the right eye, a second target member having an observation field on which there are two corresponding and substantially parallel lines serving as target means on said second target member for observation by the left eye, said corresponding target lines having the same color as the respective target lines on the target member for the right eye and having the same spacing from one another as the target lines on the target member for the right eye, and other target members that are used successively with the first or second target member, said other target members having corresponding target lines with the same colors as on the first and second target member but with the target lines spaced from one another by different distances on each of said other target members and by different distances from the spacings of the target lines on the first and second target members, the various combinations of target members when viewed binocularly producing different apparent turning of the plane defined by the target lines, the target lines on each target member being laterally spaced in the observation fields of the target members, and said observation fields, intended for the right and left eye respectively, being free of any common markings that have top or bottom limits or other discrete fusion points, and markings on the respective target members indicating the position of each marked target member in the set of target members in the order of the different spacings of the target lines from those of the other target member having the next most similar spacing of its target lines.

2. A set of depth perception targets for testing the eyes including a target member having an observation field on which there are two substantially parallel lines serving as target means for observation by the right eye, a second target member having an observation field on which there are two corresponding and substantially parallel lines serving as target means on said second target member for observation by the left eye, said corresponding target lines having the same spacing from one another as the target lines on the target member for the right eye, and other target members that are used successively with the first or second target member but with the target lines spaced from one another by different distances on each of said other target members and by different distances from the spacings of the target lines on the first and second target members, the various combinations of target members when viewed binocularly producing different apparent turning of the plane defined by the target lines, the target lines on each target member being laterally spaced in the observation fields of the target members, and said observation fields intended for the right and left eye respectively, being free of any common markings that have top or bottom limits or other discrete fusion points, and markings on the respective target members indicating the position of each marked target member in the set of the target members in the order of the different spacings of the target lines from those of the other target member having the next most similar spacing of its target lines.

3. A set of depth perception targets, as defined in claim 2, and in which there is a common reference line extending up and down across the entire observation field of each target member and serving as a part of the target means, said reference line being similarly located on each of the target members between said parallel lines and being itself parallel to said lines.

4. A set of depth perception targets as defined in claim 2, in which each of the target members has a mask which is carried by the target member and which has an opening therethrough exposing the intended field of observation of that target member, the openings in the masks of the target members for the right and left eye, respectively, being incongruent so as to avoid fusion of the observed target edges by a patient.

JOHN MARK RICHARDS.

REFERENCES CITED

The following references are of record in the file of this patent:

UNITED STATES PATENTS

| Number | Name | Date |
|---|---|---|
| 1,954,399 | Ames, Jr. | Apr. 10, 1934 |
| 2,238,207 | Ames et al. | Apr. 15, 1941 |
| 2,419,939 | Ames, Jr. | May 6, 1947 |

OTHER REFERENCES

Ogle, article in Archives of Ophthalmology, vol. 22, December 1939, pages 1046 to 1054.